United States Patent
Larsson et al.

(10) Patent No.: US 8,369,461 B2
(45) Date of Patent: Feb. 5, 2013

(54) METHOD AND ARRANGEMENT RELATING TO TELECOMMUNICATIONS

(75) Inventors: Erik Larsson, Linkoping (SE); Joakim Jaldén, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 874 days.

(21) Appl. No.: 12/522,785

(22) PCT Filed: Feb. 26, 2007

(86) PCT No.: PCT/SE2007/000175
§ 371 (c)(1),
(2), (4) Date: Jul. 10, 2009

(87) PCT Pub. No.: WO2008/105686
PCT Pub. Date: Sep. 4, 2008

(65) Prior Publication Data
US 2010/0054374 A1  Mar. 4, 2010

(51) Int. Cl.
*H04L 27/06* (2006.01)
(52) U.S. Cl. ....................................... 375/340
(58) Field of Classification Search .................. 375/136, 375/144, 260, 261, 262, 267, 295, 298, 340, 375/341; 714/701, 748, 752, 755, 756, 758
See application file for complete search history.

(56) References Cited

U.S. PATENT DOCUMENTS

| | | | |
|---|---|---|---|
| 2004/0001564 A1 * | 1/2004 | Chan et al. | 375/341 |
| 2004/0221219 A1 * | 11/2004 | Von Elbwart et al. | 714/748 |
| 2005/0094742 A1 * | 5/2005 | Yee | 375/267 |
| 2007/0076669 A1 * | 4/2007 | Boroujeny et al. | 370/335 |

FOREIGN PATENT DOCUMENTS

| | | |
|---|---|---|
| EP | 1521375 A2 | 4/2005 |
| WO | 2005/034455 A1 | 4/2005 |

OTHER PUBLICATIONS

Japanese Office Action in Japanese Application No. 2009-550825.
Stefanov, A., et al., "Turbo-Coded Modulation for Systems with Transmit and Receive Antenna Diversity over Block Fading Channels: System Model, Decoding Approaches, and Practical Considerations," IEEE Journal on Selected Areas in Communications, vol. 19, No. 5, May 2001, pp. 958-968.
Damen, M. O., et al., "On Maximum-Likelihood Detection and the Search for the Closest Lattice Point," IEEE Transactions on Information Theory, vol. 49, No. 10, Oct. 2003, pp. 2389-2402.

(Continued)

*Primary Examiner* — David C. Payne
*Assistant Examiner* — Syed Haider
(74) *Attorney, Agent, or Firm* — Potomac Patent Group PLLC

(57) ABSTRACT

The present invention relates to a method and arrangement for providing a reliability information on information bits (bk) transmitted in a communications network, said bits constituting a transmitted vector (s) comprising elements selected by a transmitter from finite alphabet (S), wherein said transmitted vector is detected from an observed vector received symbols (y) providing a log-likelihood (L). Thus, the approximation is done by defining a number of bit terms having constant size and selecting a subset of bits and marginalizing over a selected part of said subset of bits.

21 Claims, 5 Drawing Sheets

OTHER PUBLICATIONS

Jalden, J., et al., "On the Complexity of Sphere Decoding in Digital Communications," IEEE Transactions on Signal Processing, vol. 53, No. 4, Apr. 2005, pp. 1474-1484.

Hochwald, B. M., et al., "Achieving Near-Capacity on a Multiple-Antenna Channel," IEEE Transactions on Communications, vol. 51, No. 3, Mar. 2003, pp. 389-399.

Jalden, J., et al., "Full Diversity Detection in MIMO Systems with a Fixed-Complexity Sphere Decoder," Proc. IEEE ICASSP '07, Apr. 2007, pp. 49-52.

Wolniansky, P. W., et al., "V-Blast: An Architecture for Realizing Very High Data Rates Over the Rich-Scattering Wireless Channel," Proc. URSI International Symposium on Signals, Systems and Electronics, ISSSE, 1998, pp. 295-300.

Hassibi, B., et al., "High-Rate Codes That Are Linear in Space and Time," IEEE Transactions on Information Theory, vol. 48, No. 7, Jul. 2002, pp. 1804-1824.

Barbero, L. G., et al., "A Fixed-Complexity MIMO Detector Based on the Complex Sphere Decoder," Proc. IEEE SPAWC06, Jul. 2006, pp. 1-5.

International Search Report for PCT/SE2007/000175 mailed Dec. 20, 2007.

* cited by examiner

METHOD AND ARRANGEMENT RELATING TO TELECOMMUNICATIONS

TECHNICAL FIELD

The present invention relates to communications network and especially communications network in which a number of transmit and receive antennas are used.

BACKGROUND OF THE INVENTION

The existing wireless mobile communication systems provide several types of services and mostly depend on channel coding to overcome any inferiority of channels. However, due to the increasing demands, for example for high-quality multimedia services, in which users can communicate with anyone regardless of time and place, the existing services have evolved data-oriented services. Accordingly, there is a high demand for next generation wireless transmission technology for transmitting the larger amount of data at a lower error rate. In particular, it is very important to transmit data at a high rate in a link in which the amount of required data is large.

For the next generation wireless communications, various antenna systems have been proposed. For example, a Multiple Input, Multiple output (MIMO) system, i.e., a typical antenna system, increases spectrum efficiency through all of transmission antennas without excessive use of a frequency bandwidth. Generally, MIMO is classified into Space-Time Coding (STC), Diversity, Beam Forming (BF), and Spatial Multiplexing (SM) according to the transmission structure and scheme of a transmitter, all of which provide high data rate and reliability.

A MIMO system adopts multiple antennas or array antenna to transmit/receive data in the transmitter and receiver. Multiple antennas are provided in different spatial positions, with different fading features, thus the received signals of adjacent antennas can be approximated as uncorrelated entirely as long as the spacing between adjacent antennas for transmitting/receiving signals in the MIMO system is large enough. The MIMO system takes full advantage of the spatial characteristics of multipath for implementing space diversity transmission and reception.

FIG. 1 illustrates an exemplary and simplified MIMO system 100 constructed by M Tx antennas 103 and N Rx antennas 104. As mentioned earlier, the antenna spacing between the Tx antennas and Rx antennas in the MIMO system in FIG. 1 is generally big enough, to guarantee the spatial un-correlation of signals. As FIG. 1 shows, in the transmitter, MIMO architecture unit 101 first transforms a channel of data stream into M channels of parallel sub data streams; then, multiple access transform unit 102 performs multiplex processing; finally, the corresponding M Tx antennas 103 transmit the signal simultaneously into the wireless channels. The MIMO architecture unit 101 can adopt any one of the MIMO processing methods, such as STTC (Space Time Trellis Code), space-time block code, space-time Turbo code, BLAST code and etc. While multiple access transform unit 102 can implements TDD, FDD or CDMA. Efficient demodulation of MIMO is non-trivial and currently a hot research topic.

In many communications receivers there is a need to separate multiple symbols that have undergone mixing due to a channel that introduces cross-talk. In particular, this is a key problem for MIMO receivers where this mixing is induced by the propagation channel. A common mathematical model for such a cross-talk channel is:

$$y = Hs + e \quad (1)$$

wherein s is a transmitted vector (of length $n_t$). The vector s has elements that are chosen by the transmitter from a finite alphabet S (Quadrature Amplitude Modulation (QAM) for example), H is a channel matrix of dimension $n_r \times n_t$, where $n_r$ is the number of receive antennas and $n_t$ the number of transmit antennas, and e is a vector of additive Gaussian noise.

The model (1) is general enough to also describe MIMO Systems that use (not-necessarily orthogonal) Space-Time Block Coding (STBC), by appropriately using a structured matrix H.

The receiver must detect s from an observed y. In systems that use Channel coding of any sort (convolutional, turbo, etc.) it is also of interest to compute soft decisions (reliability information) on the information bits $b_{k,i}$ that constitute s. One can show [1] that if all symbols are equally likely a priori this amounts to Computing $$L(b_{k,i} | y) = \log \left( \frac{\sum_{s:b_{k,i}(s)=1} \exp\left(-\frac{1}{N_0}\|y - Hs\|^2\right)}{\sum_{s:b_{k,i}(s)=0} \exp\left(-\frac{1}{N_0}\|y - Hs\|^2\right)} \right) \quad (2)$$

where $N_0$ is the power spectral density of the noise. Here $b_{k,i}(s)$ is the ith information bit of the kth element of the transmitted vector s. The notation s: $b_{k,i}(s) = \beta$ means the set of all vectors s for which $b_{k,i}$ equals $\beta$.

Evaluation of (2) amounts to marginalizing a probability density function and this can be done in a brute-force manner. The problem however is that this has too high complexity to be useful in practice. More precisely evaluating (2) requires $O(2^{mn_t})$ operations where m is the number of bits per symbol in s. Even with hardware in the foreseeable future this is not possible to implement even for moderately large $n_t$.

Previous approaches to this problem include various approximations to (2). In the following some known approaches are presented along with a discussion of their main drawbacks:

Log-max approximation. This approximates the two sums in (2) with their largest term:

$$L(b_{k,i} | y) \approx \log \left( \frac{\max_{s:b_{k,i}(s)=1} \exp\left(-\frac{1}{N_0}\|y - Hs\|^2\right)}{\max_{s:b_{k,i}(s)=0} \exp\left(-\frac{1}{N_0}\|y - Hs\|^2\right)} \right) \quad (3)$$

The problems with this approach include:

There is a Performance loss associated with discarding all but one term in the sum.

Finding the maximum term in the sum requires solving an integer constrained least-squares problem. The best known technique for this is the sphere decoding algorithm [2] and its relatives, which has an average complexity that grows exponentially with $n_t$ [3]. Additionally, its complexity is random in the sense that the number of operations needed to compute (3) will be different for each received vector y. This presents a serious problem for implementation, as it requires either hardware designed for worst-case complexity, or data buffers of various kinds. The sequential structure of the sphere decoding algorithm also seriously limits the amount of parallelization which can be achieved when the algorithm is implemented in an ASIC.

List-sphere-decoding [4]. The idea is to approximate the sums in (2) with a sum over a subset of the terms, namely the terms encountered when running the so-called sphere decoding algorithm.

The problems with this approach are

There is a Performance loss associated with discarding all but a subset of terms in the sum.

1. The sphere decoding algorithm and its relatives have an expected complexity exponential in $n_t$ [3]. Additionally its complexity is random and the list-sphere decoder inherits the implementational issues of the original sphere decoder.

2. There is an issue relating to how various parameters of the algorithm should be selected in order for the subsets (over which the sums in (2) are computed) to always contain at least one member.

Heuristic approximations based on linear preprocessing of the data. The problems with this approach is very poor to unacceptable Performance on slow fading Channels

SUMMARY OF THE INVENTION

The present invention presents a computationally simple solution to the problem of providing high-quality soft decisions, especially in MIMO systems. The method according to the invention has fixed (i.e. non-random) complexity, i.e. the number of operations required per received bit does not depend on the channel or noise realization. This makes the technique, amongst others, to:

3. avoid random decoding delays;
4. suitable for implementation, especially in parallelized hardware; and
5. stand out from competing Solutions based on various flavors of sphere decoding, which has random complexity.

These objectives are achieved using a method for providing a reliability information on information bits transmitted in a communications network. The bits constituting a transmitted vector comprise elements selected by a transmitter from a finite alphabet. The transmitted vector is detected from an observed vector of received symbols providing a log-likelihood. The method comprises: approximating the log-likelihood by defining a number of bit terms having constant size and selecting a subset of bits and marginalizing over a selected part of the subset of bits.

In the most preferred embodiment the approximation comprises:

$$L(b_k \mid y) \approx \log \left( \frac{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}}, \ldots, b_{l_{n_t m}}} \mu(b_{l_1}, \ldots, b_{l_{k-1}}, 1, b_{l_{k+1}}, \ldots, b_{l_{n_t m}}) \right)}{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}}, \ldots, b_{l_{n_t m}}} \mu(b_{l_1}, \ldots, b_{l_{k-1}}, 0, b_{l_{k+1}}, \ldots, b_{l_{n_t m}}) \right)} \right)$$

For $k \leq r$ $$L(b_k \mid y) \approx \log \left( \frac{\sum_{b_{l_1}=0}^{1} \cdots \sum_{b_{l_r}=0}^{1} \left( \max_{b_{l_{r+1}}, \ldots, b_{l_{k-1}}, b_{l_{k+1}}, \ldots, b_{l_{n_t m}}} \mu(b_{l_1}, \ldots, b_{l_{k-1}}, 1, b_{l_{k+1}}, \ldots, b_{l_{n_t m}}) \right)}{\sum_{b_{l_1}=0}^{1} \cdots \sum_{b_{l_r}=0}^{1} \left( \max_{b_{l_{r+1}}, \ldots, b_{l_{k-1}}, b_{l_{k+1}}, \ldots, b_{l_{n_t m}}} \mu(b_{l_1}, \ldots, b_l b_{l_{k+1}}, \ldots, b_{l_{n_t m}}) \right)} \right)$$

For $k > r$, where $$\mu(b_0, \ldots, b_{n_t m}) \triangleq \exp\left(-\frac{1}{N_0} \| y - Hs(b_0, \ldots, b_{n_t m}) \|^2\right)$$

wherein
each bit in the vector (s) is enumerated as $\{b_k\}_{k=1}^{n_t m}$, wherein $n_t$ is the number of transmit antennas and m the number of transmitted bits.
r is a fixed integer in an interval $0 \leq r \leq n_t m - 1$
I is an index permutation on $[1, \ldots, n_t m]$ such that $b_{\mathcal{I}_1}, b_{\mathcal{I}_2}, \ldots, b_{\mathcal{I}_{n_t m}}$ enumerate the bits in increasing order of reliability,
k is $1 \leq k \leq n_t m$, and for a given k let k' is a uniquely defined integer such that $I_{k'} = k$, $s(b_0, \ldots, b_{ntm})$ is the vector s which corresponds to the bits $\{b_1, \ldots, b_{ntm}\}$,
H is a channel matrix of dimension $n_r \times n_t$, where $n_r$ number of receive and $n_t$ transmit antennas, and
$N_0$ is power spectral density of noise.

Preferably, the maximum of $\mu(b_0, \ldots, bn_t m)$ is obtained using a linear receiver followed by clipping. Preferably, for simplifying the approximation, the marginalizing is over r-bits considered as inferior bits. Yet, a further approximation may be applied by replacing the maxima with a simple, constant complexity estimate. Thus, the estimate may be obtained by one of a zero forcing receiver, or nulling and cancelling.

Moreover, a bit ordering, I, is obtained by groping bits into symbols and choosing a symbol ordering, $\mathcal{J}$, according to a brute-force enumeration of all possible orderings:

$$\mathcal{J}^* = \arg\max_{\mathcal{J}} \ cond(\overline{H}_{\mathcal{J}}), \ \overline{H}_{\mathcal{J}} = \left[ h_{\mathcal{J}_{r/m+1}}, \ldots, h_{\mathcal{J}_{n_t}} \right] \quad \text{Eq. 1}$$

where cond(.) refers to a condition number of a matrix. The bit ordering I may then be obtained from $\mathcal{J}$ by identifying to which symbol a particular bit is mapped. Thus, $\mathcal{J}$ is chosen by:
i. Letting $\mathcal{J} = [\ ]$ and $\mathcal{J}^c = [1, \ldots, 2 n_t]$.
ii. Computing $\gamma = \text{diag}\{(\overline{H}^T \overline{H})^{-1}\}$. Let i be the index of the largest element of $\gamma$
iii. Setting $\mathcal{J} := [\mathcal{J}, \mathcal{J}^c_i]$.
iv. Removing the ith column from H.
v. Removing the ith element of $\mathcal{J}^c$.
vi. If H is empty, terminating otherwise repeating from step ii.

Moreover, Eq. 1 may be approximated where $\mathcal{J}$ is the index vector obtained by sorting $\text{diag}\{(\overline{H}^T \overline{H})^{-1}\}$.

In one embodiment, penalty factors that correspond to a priori information on the bits that constitute s may be inserted.

The network may comprise a number of transmit and receive antennas, being one of Multiple-Input, Multiple-Output (MIMO), The invention also relates to a communications network infrastructure arrangement comprising a computational device for providing a reliability information on transmitted information bits. The bits constituting a transmitted vector (s) comprising elements selected by a transmitter from a finite alphabet (S). The transmitted vector may be detected from an observed vector of received symbols (y) providing a log-likelihood (L). Thus, the device comprises a unit for detecting the transmitted vector from an observed vector of received symbols, (y), a processing unit for applying approximation by defining a number of bit terms having constant size, a selector means for selecting a subset of bits and calculation means for marginalizing over a selected part of the subset of the bits. I one embodiment, the device further comprises a linear receiver followed by clipping or a decision feed-back type receiver with optimal ordering. The linear receiver may use one of a Zero Forcing (ZF) or Minimum Mean-Squared Error (MMSE).

The invention also relates to communications device comprising a processing unit handling communication data and communication control information, a memory unit, an interface unit, a communication unit with a respective connecting interface and transmit receive antennas. The device further comprises an arrangement for providing a reliability information on transmitted information bits, the bits constituting a transmitted vector comprising elements selected by a transmitter from a finite alphabet. The transmitted vector is detected from an observed vector of received symbols providing a log-likelihood. The communication unit is operatively arranged to detect the transmitted vector from an observed vector of received symbols. The processing unit is for applying approximation by defining a number of bit terms having constant size, a selector means for selecting a subset of bits and calculation means for marginalizing over a selected part of the subset of the bits.

BRIEF DESCRIPTION OF THE DRAWINGS

In the following, the invention will be exemplified with reference to number of embodiments, as illustrated in the drawings, in which.

DETAILED DESCRIPTION OF PREFERRED EMBODIMENTS

Figure 1:
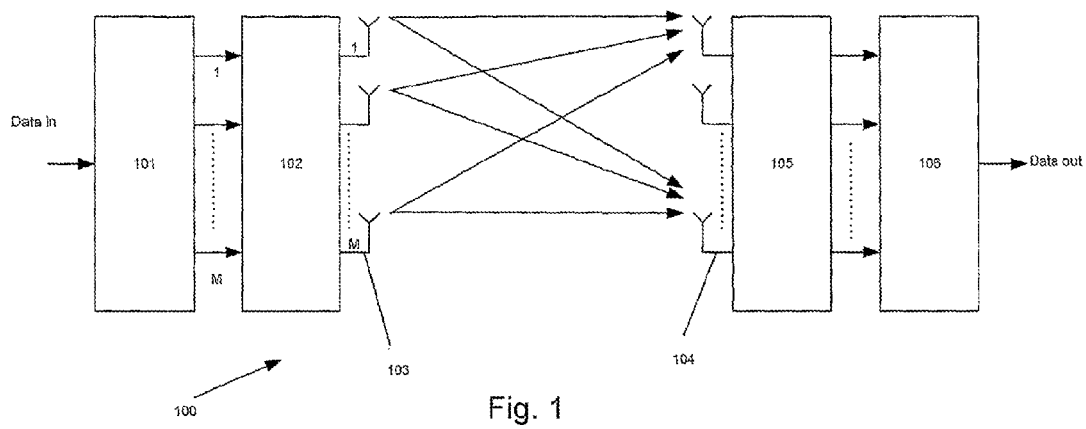
FIG. 1 is a schematic diagram of a MIMO system.

The present invention provides a new way to compute the following approximations of (2). In the following, to avoid working with double indices, all bits in s are enumerated as $\{b_k\}_{k=1}^{n_t m}$, wherein $n_t$ is the number of transmit antennas and m the number of transmitted bits.

Let r be a fixed integer (user parameter) in the interval $0 \leq r \leq n_t m - 1$. Let I be an index permutation on $[1, \ldots, n_t m]$ so that $b_{\mathcal{I}_1}, b_{\mathcal{I}_2}, \ldots, b_{\mathcal{I}_{n_t m}}$ enumerates the bits in increasing order of reliability, i.e. the most uncertain bits first. Then for a given k, $1 \leq k \leq n_t m$, let k' be the uniquely defined integer such that $I_{k'} = k$. We propose the following approximations:

$$L(b_k \mid y) \approx \quad (4)$$

$$\log \left\{ \frac{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_t m}}} \mu(b_{l_1},\ldots,b_{l_{k-1}},1,b_{l_{k+1}},\ldots,b_{l_{n_t m}}) \right)}{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_t m}}} \mu(b_{l_1},\ldots,b_{l_{k-1}},0,b_{l_{k+1}},\ldots,b_{l_{n_t m}}) \right)} \right\}$$

For $k \leq r$ $$L(b_k \mid y) \approx \log \left\{ \frac{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_t m}}} \mu(b_{l_1},\ldots,b_{l_{k-1}},1,b_{l_{k+1}},\ldots,b_{l_{n_t m}}) \right)}{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_t m}}} \mu(b_{l_1},\ldots,b_{l_{k-1}},0,b_{l_{k+1}},\ldots,b_{l_{n_t m}}) \right)} \right\} \quad (5)$$

For $k > r$, where $$\mu(b_0,\ldots,b_{n_t m}) \triangleq \exp\left(-\frac{1}{N_0} \|y - Hs(b_0,\ldots,b_{n_t m})\|^2\right)$$

Here $s(b_0, \ldots, b_{n_t m})$ stands for the vector s which corresponds to the bits $\{b_0, \ldots, b_{n_t m}\}$.

Simply, the invention implies defining a number of terms having constant size and selecting a subset of bits and marginalize over a selected part of the said bits. Thus, the motivation of the approximations in (4) and (5) is that the typical errors encountered in the detection process occur when the MIMO Channel degenerates in a few spatial dimensions. By marginalizing over the "worst" r-bits (as in done in (4) and (5)) this problem is effectively eliminated. Additionally, although it is certainly possible for a large number of bits to simultaneously be of poor quality, such an event occurs less frequently and does not seriously affect the overall Performance. Similar behavior has been observed and quantified (in a theoretically rigorous fashion) in the case of un-coded communication systems [5].

As is, approximations (4) and (5) are not efficiently computable due to the inherent problem of solving the maxima in (4) and (5). Note that this is identical to the problem faced in log-max approximation in (3) and therefore implementing (4) and (5) directly would not circumvent this problem. Therefore, a further approximate (4) and (5) by replacing the maxima with a simple, constant complexity, estimate such as for example the estimate obtained by the zero forcing (hard decision) receiver, or nulling and cancelling.

A key aspect of the proposed approach is that replacing the maxima in (4) and (5) by the estimates obtained by a simple (i.e. Zero Forcing (ZF) or Minimum Mean-Squared Error (MMSE)) receiver will not degenerate performance significantly if done correctly. The reason for this is that this (sub-optimal) approximation in only taken for the "'best" $n_t m - r$ bits which are much easier to determine even for a sub-optimal detector. Assume now that r is an integer multiple of the number of bits per symbol which implies that full marginalization is done over full symbols. The ability of a sub-optimal method to obtain the maxima in (4) and (5) is crucially dependent on the conditioning of the effective Channel matrix which is obtained when removing the "worst" r/m Symbols. Therefore, a good strategy is to find the worst r/m symbols (or equivalently r bits) by minimizing the resulting Channel matrix condition number. To be specific, let $\mathcal{J}$ be an index permutation on $[1, \ldots, n_t]$, then the symbol ordering is found according to:

$$\mathcal{J}^* = \arg\max_{\mathcal{J}} \; cond(\overline{H}_{\mathcal{J}}), \; \overline{H}_{\mathcal{J}} = \left[ h_{\mathcal{J}_{r/m+1}}, \ldots, h_{\mathcal{J}_{n_t}} \right]. \quad (6)$$

where cond(.) refers to the condition number of a matrix. The bit ordering $\mathcal{J}$ is then obtained from $\mathcal{S}$ by identifying to which symbol a particular bit is mapped. Further, since the maximum in (6) has to be found by searching over $$\binom{n_t}{r/m}$$

candidate orderings, it will often make sense to use some form of approximation to (6).

Such an approximation may comprise the steps of:

$\mathcal{J}$ is chosen 310 according to the algorithm (previously proposed and used for hard detection in [6]) given by:

320) Let $\mathcal{J} = [\,]$ and $\mathcal{J}^c = [1, \ldots, 2\, n_t]$.

330) Compute $\gamma = \text{diag}\{(\overline{H}^T \overline{H})\}$. Let i be the index of the largest element of $\gamma$.

340) Set $\mathcal{J} := [\mathcal{J}, \mathcal{J}_i^c]$.

350) Remove the ith column from H.

360) Remove the ith element of $\iota$.

370) If H is empty, terminate. Otherwise repeat from step 330).

(6) may also be approximated where $\mathcal{J}$ is the index vector obtained by sorting diag$\{(\overline{H}^T\overline{H})^{-1}\}$ Evidently, any other approximation of (6) may occur.

Expressions of type $$\log\left\{\sum_k e^{a_k}\right\}$$

can be evaluated by recursively applying identity $\log(e^a+e^b)=\max(a,b)+\log(1+e^{-|a-b|})$ and using a lookup-table the function $f(x)=\log(1+e^{-|x|})$ can be solved. The same is applicable to (4) and (5).

For the case of a separable constellation (such as rectangular QAM or QPSK) the model (1) may be equivalently formulated as $$\overline{y}=\overline{H}\overline{s}+\overline{e} \qquad (7)$$

Where $$\overline{y}=\begin{bmatrix}\Re y\\ \mathcal{J}y\end{bmatrix}, \overline{s}=\begin{bmatrix}\Re s\\ \mathcal{J}s\end{bmatrix}, \overline{e}=\begin{bmatrix}\Re e\\ \mathcal{J}e\end{bmatrix}, \overline{H}=\begin{bmatrix}\Re H & -\mathcal{J}H\\ \mathcal{J}H & \Re H\end{bmatrix}$$

In (7), all quantities are real-valued. Thus, with QPSK modulation, the elements of s are binary (they are ±1, up to a possible scaling factor). This means that each element of s corresponds to exactly one Information bit. Using (7) allows for more flexibility in choosing r than for the complex valued equivalent model. Also, in the QPSK case it can be assumed that $\mathcal{J}=I$ since bits and (real valued) Symbols are interchangeable under (7).

Figure 2:
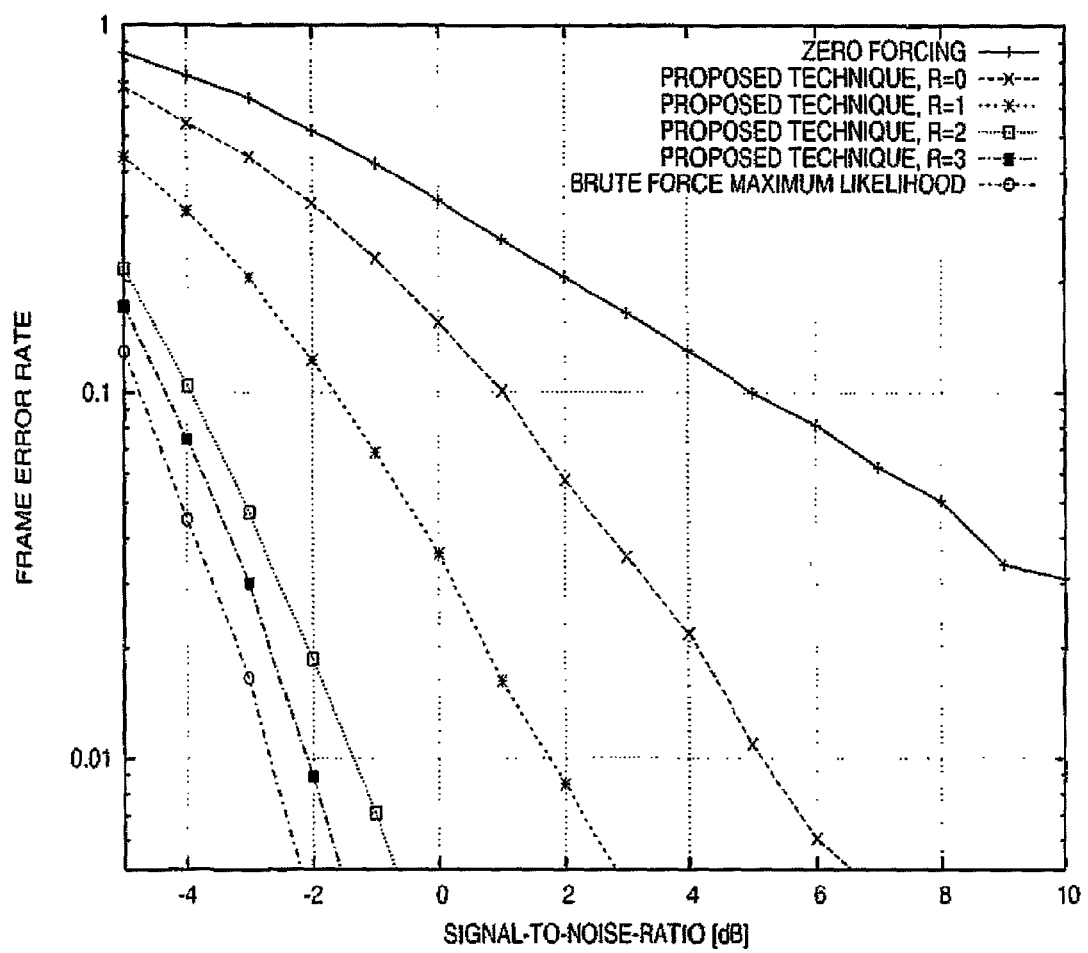
FIG. 2 illustrates a graph over a MIMO system with $n_t = 4$ transmit antennas, $n_r = 4$ receive antennas, QPSK modulation, slow Rayleigh fading. Each codeword consists of 100 bits and spans one channel realization.
Figure 3:
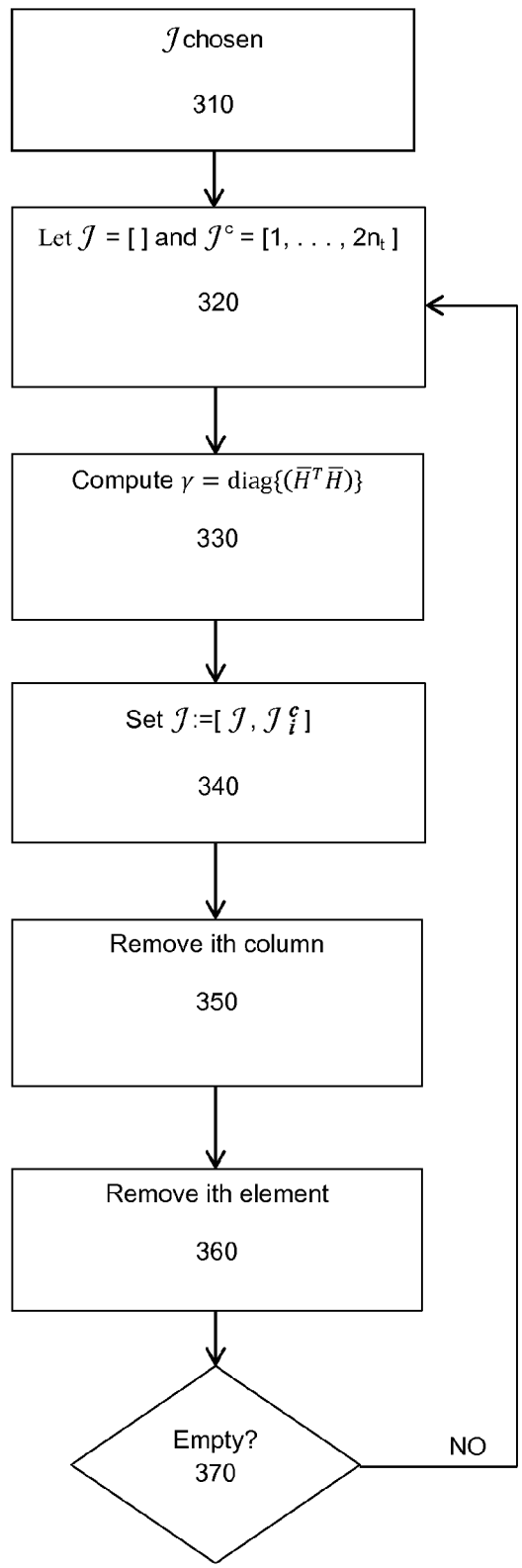
FIG. 3 is a flow diagram illustrating the steps according to the invention.

The performance of the proposed soft demodulation technique is illustrated in FIG. 2 for a slow fading 4×4 MIMO System with QPSK modulation and rate-⅓ convolutional coding. The Channel model is rewritten according to (7). There is a tradeoff between r and the Performance obtained. The complexity is roughly $0(2^r n_t n_r)$. The results show that Performance is close to that of the brute-force maximum-a posteriori detector (2), even for small values of r.

The invention may be implemented as a hardware or software solution or a combination of these.

Figure 4:
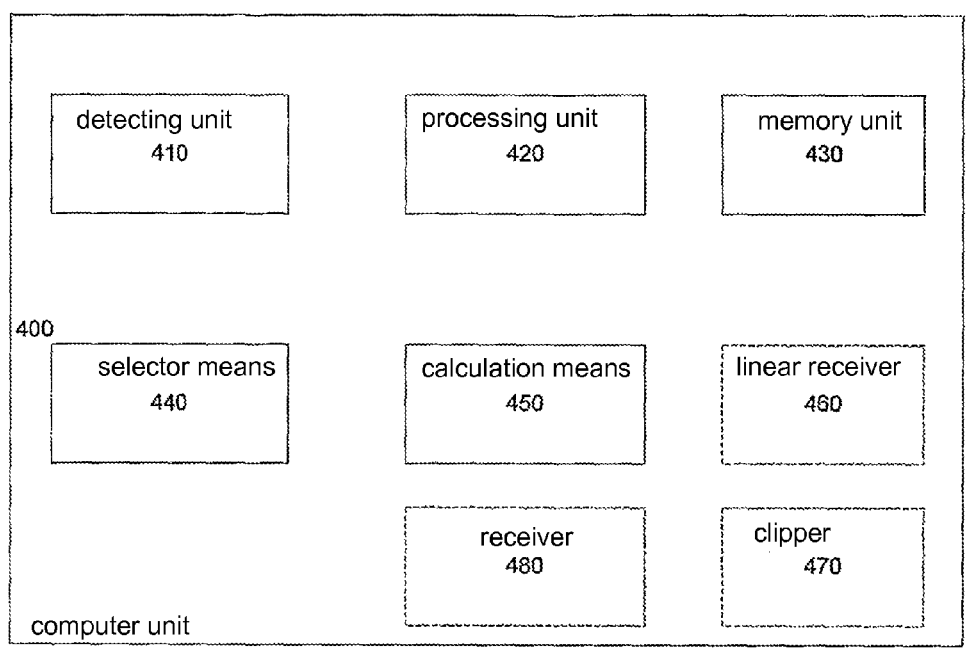
FIG. 4 is a block diagram illustrating an arrangement implementing the invention.

The invention may be implemented in a network node, which may comprise a computer unit 400 for processing signals, as illustrated in FIG. 4. The network is assumed to have a number of transmit antennas transmitting $n_T$ symbols, and in which $x_m$, denotes symbols transmitted, wherein m=1 ... $n_T$. A symbol alphabet is assumed to contain L symbols. The computer unit 400, as illustrated schematically in FIG. 4, may comprise a unit 410 for detecting the transmitted vector from an observed vector of received symbols, y, a processing unit 420 for applying approximation by defining a number of bit terms having constant size stored in a memory 430 and a selector means 440 for selecting a subset of bits and calculation means 450 for marginalizing over a selected part of the subset of the bits.

More especially, the computing unit 400 according to one embodiment comprises a linear receiver 460 output of which is coupled to a clipper 470. The linear receiver may use a Zero Forcing (ZF) or Minimum Mean-Squared Error (MMSE). In another embodiment a decision feed-back type receiver 480 with optimal ordering can be used.

Figure 5:
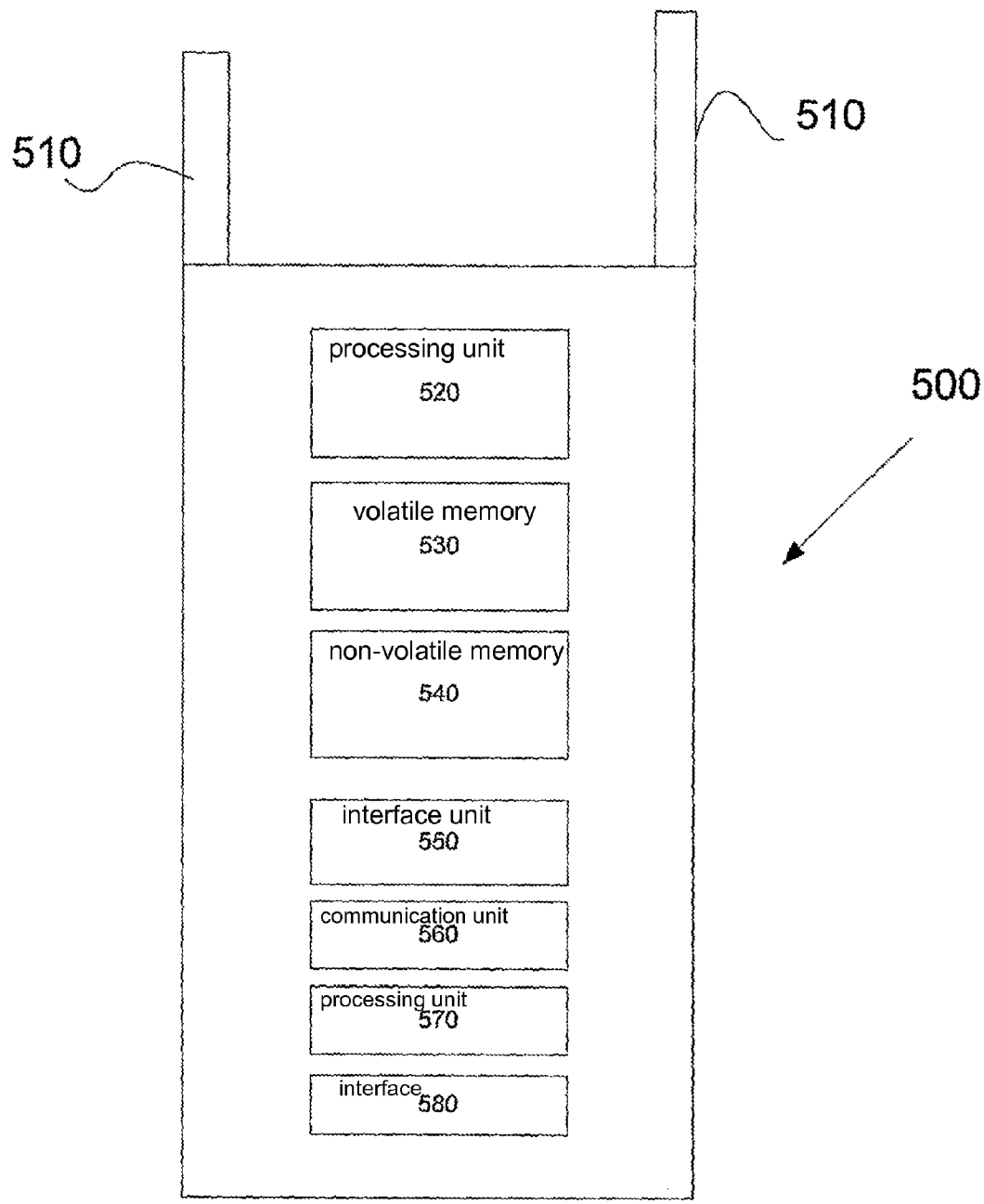
FIG. 5 is a block diagram illustrating a user unit implementing the invention.

FIG. 5 illustrates in a schematic block diagram a user equipment (UE) 500 implementing teachings of the present invention, wherein a processing unit 520 handles communication data and communication control information. The UE 500 further comprises a volatile (e.g. RAM) 530 and/or non volatile memory (e.g. a hard disk or flash disk) 540, an interface unit 550. The UE 500 may further comprise a mobile communication unit 560 with a respective connecting interface. All units in the UE can communicate with each other directly or indirectly through the processing unit 570. Software for implementing the method according to the present invention may be executed within the UE 500. The UE 500 may also comprise an interface 580 for communicating with an identification unit, such as a SIM card, for uniquely identifying the UE in a network and for use in the identification of the 'SIGN' (i.e. traffic counting and digital signature of the UE). Other features often present in UE are not shown in FIG. 5 but should be understood by the person skilled in the art, e.g. for a mobile phone: MIMO antennas 510, camera, replaceable memory, screen and buttons. The computer unit according FIG. 4 may be implemented as an additional part or part of the processing unit.

The invention is not limited to MIMO systems and may be implemented in any multiple transmit/receive systems such as Single-Input-Multiple-Output (SIMO), Multiple-Input-Single-Output MISO etc.

The problem solved by the present invention is important for all demodulation problems in the presence of cross-talk, with MIMO as an outstanding example. For MIMO it is applicable both to systems that use spatial multiplexing (e.g. V-BLAST) [7] and space-time coding (for example, linear dispersion codes [8]). Such systems are currently undergoing standardization.

The invention itself, however, is not limited to any particular standard.

It should be noted that the word "comprising" does not exclude the presence of other elements or steps than those listed and the words "a" or "an" preceding an element do not exclude the presence of a plurality of such elements. The invention can at least in part be implemented in either software or hardware. It should further be noted that any reference signs do not limit the scope of the claims, and that several "means", "devices", and "units" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

REFERENCES

[1] A. Stefanov and T. M. Duman, "Turbo-coded modulation for systems with transmit and receive antenna diversity over block fading Channels: System model, decoding approaches, and practical considerations," *IEEE Journal on Selected Areas in Communications*, vol. 19, pp. 958-968, May 2001.

[2] M. O. Damen, H. E. Gamal, and G. Caire, "On maximum-likelihood detection and the search for the closest lattice point," *IEEE Transactions on Information Theory*, vol. 49, pp. 2389-2401, October 2003.

[3] J. Jalden and B. Ottersten, "On the complexity of sphere decoding in digital communications," *IEEE Transactions on Signal Processing*, vol. 53, pp. 1474-1484. April 2005.

[4] B. M. Hochwald and S. Brink, "Achieving near-capacity on a multiple-antenna Channels," *IEEE Transactions on Communication*, vol. 51. pp. 389-399, March 2003.

[5] J. Jalden, L. G. Barbero, J. S. Thompson, and B. Ottersten. "Full diversity detection in MIMO systems with a fixed-complexity sphere decoder," in *Proc. IEEE ICASSP '07*. (Hawaii, USA), April 2007.

[6] L. G. Barbero and J. S. Thompson, "A fixed-complexity MIMO detector based on the complex sphere decoder," in *Proc. IEEE SPAWC06*, (Cannes, France), July 2006.

[7] P. W. Wolniansky, G. J. Foschini, G. D. Golden, and R. A. Valenzuela, "V-BLAST: An architecture for realizing very high data rates over the rich-scattering wireless Channel," in *Proc. URSI International Symposium on Signals, Systems and Electronics, ISSSE*, 1998.

[8] B. Hassibi and B. M. Hochwald, "High-rate codes that are linear in space and time." *IEEE Transactions on Information Theory*, vol. 48, pp. 1804-1824. June 2002.

The invention claimed is:

1. A method for providing a reliability information on information bits ($b_k$) transmitted in a communications network, said bits constituting a transmitted vector (s) comprising elements selected by a transmitter from a finite alphabet (S), wherein said transmitted vector is detected from an observed vector of received symbols (y) providing a log-likelihood (L), the method comprising:

approximating said log-likelihood (L) by defining a number of bit terms having constant size and selecting a subset of bits and marginalizing over a selected part of said subset of bits, wherein said approximation comprises:

$$L(b_k \mid y) \approx$$

$$\log \left\{ \frac{\sum_{b_{l_r}=0}^{1} \left( \max_{b_{l_{r+1}},\ldots,b_{l_{n_tm}}} \mu(b_{l_1}, \ldots, b_{l_{k-1}}, 1, b_{l_{k+1}}, \ldots, b_{l_{n_tm}}) \right) \sum_{b_{l_1}=0}^{1} \cdots \sum_{b_{l_{k-1}}=0}^{1} \sum_{b_{l_{k+1}}=0}^{1} \cdots }{\sum_{b_{l_r}=0}^{1} \left( \max_{b_{l_{r+1}},\ldots,b_{l_{n_tm}}} \mu(b_{l_1}, \ldots, b_{l_{k-1}}, 0, b_{l_{k+1}}, \ldots, b_{l_{n_tm}}) \right) \sum_{b_{l_1}=0}^{1} \cdots \sum_{b_{l_{k-1}}=0}^{1} \sum_{b_{l_{k+1}}=0}^{1} \cdots} \right\}$$

For $k \leq r$ $$L(b_k \mid y) \approx \log \left\{ \frac{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1}, \ldots, b_{l_{k-1}}, 1, b_{l_{k+1}}, \ldots, b_{l_{n_tm}}) \right) }{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1}, \ldots, b_l b_{l_{k+1}}, \ldots, b_{l_{n_tm}}) \right)} \right\}$$

For $k > r$, where $$\mu(b_0, \ldots, b_{n_tm}) \triangleq \exp\left(-\frac{1}{N_0} \|y - Hs(b_0, \ldots, b_{n_tm})\|^2\right)$$

wherein
each bit in said vector (s) is enumerated as $\{b_k\}$ $$\{b_k\}_{k=1}^{n_tm},$$

wherein $n_t$ is the number of transmit antennas and m the number of transmitted bits, r is a fixed integer in an interval $0 \leq r \leq n_tm-1$ I is an index permutation on $[1, \ldots, n_tm]$ such that $b_{J_1}$, $b_{J_2}, \ldots, b_{J_{n_tm}}$ enumerate the bits in increasing order of reliability, k is $1 \leq k \leq n_tm$, and for a given k let k' is a uniquely defined integer such that $l_{k'}=k$, $s(b_0, \ldots, b_{ntm})$ is the vector s which corresponds to the bits $\{b_1, \ldots, b_{ntm}\}$, H is a channel matrix of dimension $n_r \times n_1$, where $n_r$ number of receive and $n_t$ transmit antennas, and $N_0$ is rower spectral density of noise.

2. The method of claim 1, wherein a maximum of $\mu(b_o, \ldots, bn_tm)$ is obtained using a linear receiver followed by clipping.

3. The method of claim 1, wherein using a decision feedback type receiver with optimal ordering.

4. The method of claim 2, wherein said linear receiver uses one of a Zero Forcing (ZF) or Minimum Mean-Squared Error (MMSE).

5. The method of claim 1, wherein said marginalizing is over r-bits considered as inferior bits.

6. The method of claim 1, comprising a further approximation by replacing the maxima with a simple, constant complexity, estimate.

7. The method of claim 5, wherein said estimate is obtained by one of a zero forcing receiver, or nulling and cancelling.

8. The method of claim 1, wherein a bit ordering, I, is obtained by groping bits into symbols and choosing a symbol ordering, $\mathcal{J}$, according to a brute-force enumeration of all possible orderings:

$$\mathcal{J}^* = \arg\max_{\mathcal{J}} cond(H\mathcal{J}), H\mathcal{J} = [h\mathcal{J}_{r/m+1}, \ldots, h\mathcal{J}_{n_t}]. \quad \text{Eq. 1}$$

where cond(.) refers to a condition number of a matrix.

9. The method of claim 8, wherein the bit ordering I is then obtained from $\mathcal{J}$ by identifying to which symbol a particular bit is mapped.

10. The method of claim 8, wherein $\mathcal{J}$ is chosen by:
i. Letting $\mathcal{J} = [\ ]$ and $\mathcal{J}^c = [1, \ldots, 2n_t]$;
ii. Computing $\gamma = \text{diag}\{(H^TH)^{-1}\}$ wherein i is the index of the largest element of $\gamma$;
iii. Setting $\mathcal{J} := [\mathcal{J}, \mathcal{J}_i^c]$;
iv. Removing the ith column from H;
v. Removing the ith element of $\mathcal{J}^c$; and
vi. If H is empty, terminating otherwise repeating from step ii.

11. The method of claim 8, wherein Eq. 1 is approximated where $\mathcal{J}$ is the index vector obtained by sorting $\text{diag}\{(H^TH)^{-1}\}$.

12. The method of claim 1, comprising penalty factors that correspond to a priori information on the bits that constitute s.

13. The method according to claim 1, wherein said network comprises a number of transmit and receive antennas, being one of Multiple-Input, Multiple-Output (MIMO).

14. A communications network infrastructure arrangement comprising a computational device for providing a reliability information on transmitted information bits ($b_k$), said bits constituting a transmitted vector (s) comprising elements selected by a transmitter from a finite alphabet (S), wherein said transmitted vector is detected from an observed vector of received symbols (y) providing a log-likelihood (L), wherein said device comprises a unit for detecting the transmitted vector from an observed vector of received symbols, (y), a processing unit for applying approximation by defining a number of bit terms having constant size, a selector means for selecting a subset of bits and calculation means for marginalizing over a selected part of the subset of the bits, wherein said approximation comprises:

$$L(b_k \mid y) \approx$$

$$\log \left( \frac{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_tm}}} \mu(b_{l_1},\ldots,b_{l_{k-1}},1,b_{l_{k+1}},\ldots,b_{l_{n_tm}}) \right)}{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_tm}}} \mu(b_{l_1},\ldots,b_{l_{k-1}},0,b_{l_{k+1}},\ldots,b_{l_{n_tm}}) \right)} \right)$$

For $k \leq r$ $$L(b_k \mid y) \approx \log \frac{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1},\ldots,b_{l_{k-1}},1,b_{l_{k+1}},\ldots,b_{l_{n_tm}}) \right)}{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1},\ldots,b_l b_{l_{k+1}},\ldots,b_{l_{n_tm}}) \right)}$$

For $k > r$, where $$\mu(b_0,\ldots,b_{n_tm}) \triangleq \exp\left(-\frac{1}{N_0}\|y - Hs(b_0,\ldots,b_{n_tm})\|^2\right)$$

wherein
each bit in said vector (s) is enumerated as $\{b_k\}$ $\{b_k\}_{k=1}^{n_tm}$, wherein $n_t$ is the number of transmit antennas and m the number of transmitted bits,
r is a fixed integer in an interval $0 \leq r \leq n_t m - 1$
I is an index permutation on $[1,\ldots,n_t m]$ such that $b_{j_1}, b_{j_2},\ldots,b_{j_{n_t m}}$ enumerate the bits in increasing order of reliability,
k is $1 \leq k \leq n_t m$, and for a given k let k' is a uniquely defined integer such that $l_{k'}=k$, $s(b_0,\ldots,b_{n_tm})$ is the vector s which corresponds to the bits $\{b_1,\ldots,b_{n_tm}\}$,
H is a channel matrix of dimension $n_r \times n_t$, where $n_r$ number of receive and $n_t$ transmit antennas, and
$N_0$ is power spectral density of noise.

15. The arrangement of claim 14, further comprising a linear receiver followed by clipping.

16. The arrangement of claim 14, further comprising a decision feed-back type receiver with optimal ordering.

17. The arrangement of claim 15, wherein said linear receiver uses one of a Zero Forcing (ZF) or Minimum Mean-Squared Error (MMSE).

18. A communications device comprising a processing unit handling communication data and communication control information, a memory unit, an interface unit, a communication unit with a respective connecting interface and transmit receive antennas, an arrangement for providing a reliability information on transmitted information bits ($b_k$), which constitute a transmitted vector (s) detected from an observed vector of received symbols (y) providing a log-likelihood (L), wherein said communication unit being operatively arranged to detect the transmitted vector from an observed vector of received symbols, (y), said processing unit being operatively arranged for applying approximation by defining a number of bit terms having constant size, a selector means for selecting a subset of bits and calculation means for marginalizing over a selected part of the subset of the bits, wherein said approximation comprises:

$$L(b_k \mid y) \approx$$

$$\log \left( \frac{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_tm}}} \mu(b_{l_1},\ldots,b_{l_{k-1}},1,b_{l_{k+1}},\ldots,b_{l_{n_tm}}) \right)}{\sum_{b_{l_1}=0}^{1} \cdots \sum_{b_{l_{k-1}}=0}^{1} \sum_{b_{l_{k+1}}=0}^{1} \cdots \sum_{b_{l_r}=0}^{1} \left( \max_{b_{l_{r+1}},\ldots,b_{l_{n_tm}}} \mu(b_{l_1},\ldots,b_{l_{k-1}},0,b_{l_{k+1}},\ldots,b_{l_{n_tm}}) \right)} \right)$$

For $k \leq r$ $$L(b_k \mid y) \approx \log \frac{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1},\ldots,b_{l_{k-1}},1,b_{l_{k+1}},\ldots,b_{l_{n_tm}}) \right)}{\sum_{b_{l_1}=0}^{1} \cdots \sum_{b_{l_r}=0}^{1} \left( \max_{b_{l_{r+1}},\ldots,b_{l_{k-1}},b_{l_{k+1}},\ldots,b_{l_{n_tm}}} \mu(b_{l_1},\ldots,b_l b_{l_{k+1}},\ldots,b_{l_{n_tm}}) \right)}$$

For $k > r$, where $$\mu(b_0,\ldots,b_{n_tm}) \triangleq \exp\left(-\frac{1}{N_0}\|y - Hs(b_0,\ldots,b_{n_tm})\|^2\right)$$

wherein
each bit in said vector (s) is enumerated as $\{b_k\}$ $$\{b_k\}_{k=1}^{n_t m},$$

wherein $n_t$ is the number of transmit antennas and m the number of transmitted bits,
r is a fixed integer in an interval $0 \leq r \leq n_t m - 1$
I is an index permutation on $[1, \ldots, n_t m]$ such that $b_{j_1}, b_{j_2}, \ldots, b_{j_{n_t m}}$ enumerate the bits in increasing order of reliability,
k is $1 \leq k \leq n_t m$, and for a given k let k' is a uniquely defined integer such that $l_{k'} = k$, $s(b_0, \ldots, b_{ntm})$ is the vector s which corresponds to the bits $\{b_1, \ldots, b_{ntm}\}$,
H is a channel matrix of dimension $n_r \times n_t$, where $n_r$ number of receive and $n_t$ transmit antennas, and
$N_0$ is power spectral density of noise.

19. The communications device of claim 18, further comprising a linear receiver followed by clipping.

20. The communications device of claim 18, further comprising a decision feed-back type receiver with optimal ordering.

21. The communications device of claim 19, wherein said linear receiver uses one of a Zero Forcing (ZF) or Minimum Mean-Squared Error (MMSE).

* * * * *

UNITED STATES PATENT AND TRADEMARK OFFICE
CERTIFICATE OF CORRECTION

| | |
|---|---|
| PATENT NO. | : 8,369,461 B2 |
| APPLICATION NO. | : 12/522785 |
| DATED | : February 5, 2013 |
| INVENTOR(S) | : Larsson et al. |

It is certified that error appears in the above-identified patent and that said Letters Patent is hereby corrected as shown below:

On the Title Page, Item (75), under "Inventors", in Column 1, Line 1, delete "Erik" and insert -- Erik G. --, therefor.

On the Title Page, Item (75), under "Inventors", in Column 1, Line 1, delete "Linkoping" and insert -- Linköping --, therefor.

In the Specifications

In Column 1, Line 27, delete "output" and insert -- Output --, therefor.

In Column 4, Line 6, delete "Channels" and insert -- Channels. --, therefor.

In Column 5, Line 4, delete "bits." and insert -- bits, --, therefor.

In Column 5, Line 5, delete " $0 \leqq r \leqq n_t m - 1$ " and insert -- $0 \leqq r \leqq n_t m - 1,$ --, therefor.

In Column 5, Line 11, delete " $b_{ntm})$ " and insert -- $b_{n_t m})$ --, therefor at each occurrence throughout the patent.

In Column 5, Line 12, delete " $b_{ntm}\},$ " and insert -- $b_{n_t m}\},$ --, therefor at each occurrence throughout the patent.

In Column 5, Line 16, delete " $bn_t m)$ " and insert -- $b_{n_t m})$ --, therefor at each occurrence throughout the patent.

In Column 5, Line 54, delete "(MIMO)," and insert -- (MIMO). --, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,369,461 B2

In Column 7, Line 31, delete "$b_{ntm}\}$." and insert -- $b_{n_tm}\}$. --, therefor.

In Column 7, Line 61, delete ""best"" and insert -- "best" --, therefor.

In Column 8, Line 65, delete "$\mathcal{I}$." and insert -- $\mathcal{J}^c$ --, therefor.

In Column 9, Line 2, delete "$\text{diag}\{(H^TH)^{-1}\}$." and insert -- $\text{diag}\{(H^TH)^{-1}\}$. --, therefor.

In Column 9, Line 19, in Equation (7), delete "$\bar{y}=\bar{H}\bar{s}+\bar{e}$." and insert -- $\bar{y}=\bar{H}\bar{s}+\bar{e}$ --, therefor.

In the Claims

In Column 12, Line 2, in Claim 1, delete "$\{b_k\}$".

In Column 12, Line 10, in Claim 1, delete "$0 \leq r \leq n_t m-1$." and insert -- $0 \leq r \leq n_t m-1$, --, therefor.

In Column 12, Line 15, in Claim 1, delete "l$_k$=k," and insert -- I$_k$=k, --, therefor.

In Column 12, Line 18, in Claim 1, delete "n$_r$×n$_1$," and insert -- n$_r$×n$_t$, --, therefor.

In Column 12, Line 21, in Claim 1, delete "rower" and insert -- power --, therefor.

In Column 12, Line 23, in Claim 2, delete "μ(b$_o$," and insert -- μ(b$_0$, --, therefor.

In Column 13, Line 54, in Claim 14, delete "$\{b_k\}$".

In Column 13, Line 62, in Claim 14, delete "$0 \leq r \leq n_t m-1$." and insert -- $0 \leq r \leq n_t m-1$, --, therefor.

In Column 13, Line 67, in Claim 14, delete "l$_k$=k," and insert -- I$_k$=k, --, therefor.

In Column 15, Line 2, in Claim 18, delete "$\{b_k\}$".

In Column 15, Line 10, in Claim 18, delete "$0 \leq r \leq n_t m-1$." and insert -- $0 \leq r \leq n_t m-1$, --, therefor.

In Column 15, Line 15, in Claim 18, delete "l$_k$=k," and insert -- I$_k$=k, --, therefor.